Patented Oct. 15, 1940

2,218,053

UNITED STATES PATENT OFFICE 2,218,053

WATER PURIFICATION

Kurt Schwabe, Berlin, and Karl Büche, Essen-Rellinghausen, Germany, assignors to the firm Th. Goldschmidt, A.-G., (Chemische Fabriken of Essen, Ammendorf (Saal Kreis), Germany)

No Drawing. Application February 11, 1939, Serial No. 255,988. In Germany February 18, 1938

7 Claims. (Cl. 210—23)

This invention relates to water purification; and it comprises a method of clarifying crude waters of all types, such as the so-called white water from paper mills, for example, which comprises adding to such a water a small amount of aluminum sulfite in amount sufficient to produce flock formation and precipitation, and removing the resulting precipitate; all as more fully hereinafter set forth and as claimed.

Modern methods of clarifying industrial wastes and other crude waters of all types usually include a chemical precipitation step in which the water is treated with a precipitating chemical, such as lime, iron sulfate, magnesium sulfate or aluminum sulfate. Aluminum sulfate is the chemical most widely used for the removal of color and turbidity from raw waters, especially in the production of potable water. This is due to its low cost and availability as well as to the fact that this chemical produces a voluminous flock in waters most frequently met in practice. The choice of precipitant depends to some extent upon the acidity or pH of the water being treated. For example, ferrous sulfate is most effective over a pH range of about 8.5 to 11, while aluminum sulfate produces the best results within the range of about 4 to 8 pH depending upon the kind of raw or waste water.

Aside from its use in the purification of potable water, aluminum sulfate is used most widely in the clarification of sewage, for removal of the suspended matter. It is also useful in the clarification of industrial wastes of all types. It has been used, for example, in the treatment of the so-called "white water," a trade waste from the paper manufacturing process which contains cellulose, wood pulp, kaolin and other filling materials in suspension. This suspended matter is precipitated and recovered upon treatment with aluminum sulfate.

The use of aluminum sulfate in the purification of raw waters has one rather serious objection, which is that the water is acidified to an appreciable extent by the treatment. In waters having a low alkalinity this may become serious owing to the resulting corrosion of pipe lines, etc., with which the water may come in contact. In some cases it has even been found necessary to add lime to increase the pH of the water after the clarification treatment in order to prevent corrosion difficulties. It has long been a desideratum in the art to discover a chemical precipitant having the favorable properties of aluminum sulfate without this particular disadvantage. The present invention is believed to furnish a solution of this problem.

We have found that aluminum sulfite, when added to turbid waters of all types, is capable of producing substantially better clarification than aluminum sulfate and that this chemical produces a considerably smaller increase in the acidity of the water treated. In addition we have found that the flock produced by the addition of aluminum sulfite to waters to be clarified has a rate of settling which is greater than that of the flock produced by the use of aluminum sulfate. A further advantage of using aluminum sulfite is that color removal is greater. The cause for these unexpected results is not as yet fully understood.

Owing to its slightly greater content of aluminum it would be expected, of course, that aluminum sulfite, $Al_2(SO_3)_3$, would possess a slightly greater clarifying power than the same weight of aluminum sulfate, $Al_2(SO_4)_2$. But this expected increase amounts to less than 15 per cent by weight, whereas we have found that the actual clarifying power of aluminum sulfite is usually more than double that of aluminum sulfate. It is evident that the aluminum content of the sulfite is more effective than that of the sulfate. It therefore appears that the hydrated aluminum hydroxide flock formed by aluminum sulfite must be somehow in a more favorable state to produce clarification and settling. Apparently the flock which is formed by aluminum sulfite is more dense than that formed by aluminum sulfate, this being indicated by the greater settling rate of the former. But if the flock formed by aluminum sulfite is more dense, it would be expected to be less voluminous and hence might be expected to be less effective in clarification. The aluminum sulfite would be expected to be more easily hydrolyzed but it is believed that hydrolysis is substantially complete in the case of both salts; hence this cannot be the whole explanation. The improved results secured by the use of aluminum sulfite in clarifying water are both unexpected and unpredictable.

The advantages derived from the use of aluminum sulfite in water clarification are highly important. Owing to the greater settling rate of the precipitate it is possible to employ smaller settling and mixing basins than in the case of aluminum sulfate. And owing to the better clarification produced, if filters are used, it is possible to reduce the filter area. A substantial reduction in the over-all cost of a clarification plant may be effected. It is possible, of course, to reduce the quantity of coagulent employed with the production of a water of the same clarity or to employ approximately an equal quantity of aluminum sulfite with the production of a water having a substantially greater clarity than could be produced using the same amount of aluminum sulfate.

In the cases of some waters having a high color our invention is particularly effective owing to the greater color removal produced. This is due, possibly, to the action of the sulfite ion. Our invention is equally important in the case of waters of low alkalinity which could not be clarified with aluminum sulfate without the subsequent addition of lime to increase the pH.

We have found that our process is particularly adapted to the clarification of white waters from paper mills. The lighter particles of fibrous materials in these waters are very readily entrapped or dragged down by the precipitate formed upon the addition of aluminum sulfite even in very small quantities. A greater recovery of cellulose from the white water results from the use of aluminum sulfite in this process. The aluminum sulfite may be added to the beater or to the white water itself. In fact it may be added to the paper stock at any point prior to the Fourdrinier machine. When added to the beater it also serves to precipitate the sizing agent and must be added in amount greater than that required for the production of the sizing effect alone. When added to the white water we have found that the quantity required to produce effective clarification is usually not substantially more than 0.02 per cent by weight. In one series of comparative tests we found that the addition of 0.02 per cent of aluminum sulfite produced rapid clarification of a white water from a commercial paper mill, the clarified water containing less than 30 mg. per liter of suspended matter while it required the addition of 0.05 per cent of aluminum sulfate to produce a comparable result.

In another series of comparative tests, performed on an industrial sewage, it was found that the pH of the clarified water, produced by the addition of aluminum sulfate, ranged from about 4 to 5, whereas the same waste water, clarified to at least an equal extent by the addition of aluminum sulfite, was found to have a pH ranging from about 5 to 6. The latter water, of course, would be less corrosive. This effect is more pronounced, the lower the alkalinity of the water treated. The advantages of the higher pH produced in the sulfite treatment is obvious.

The clarification procedure, subsequent to the addition of aluminum sulfite in our process, may follow conventional practice. Owing to the greater settling rate of the precipitate in our process, it is possible in some cases to use continuous clarifying equipment, supplied with rakes to discharge the sludge, where this would be impossible when use is made of aluminum sulfate as a coagulant. When a high degree of clarity is required, as in the case of potable water, for example, settling in a clarifying basin may be used, followed by filtration through sand or other types of filters.

The aluminum sulfite is, of course, employed in the form of its aqueous solution, in which form it is known commercially. Aluminum sulfite cannot be prepared in the dry state. Suitable solutions for the purpose of the present invention can be produced in the manner indicated in the U. S. Patents, Nos. 2,006,851 and 2,123,650, of which one of us (Büche) is co-inventor.

While we have described what we consider to be the best embodiments of our process, it is obvious, of course, that various modifications can be made in the procedures described without departing from the purview of this invention. The quantity of aluminum sulfite which is required to produce a given clarity of water varies widely with the type of water treated and with other conditions. The optimum amount required can be readily determined by those skilled in this art, by means of the so-called jar tests, for example. In general it may be said that effective clarification can be obtained in my process by the use of a quantity of aluminum sulfite which is about half or somewhat less than half of the quantity of aluminum sulfate which would be required to produce the same results. Many other modifications of our invention which fall within the scope of the following claims will be immediately evident to those skilled in this art.

What we claim is:

1. In the process of clarifying and decolorizing raw waters, the step which comprises adding to such a water a small amount of aluminum sulfite but sufficient to produce flock formation and precipitation.

2. The process which comprises adding a small amount of aluminum sulfite to an industrial waste water sufficient to produce flock formation and precipitation and separating the precipitate from said water.

3. The process which comprises adding a small amount of aluminum sulfite to a white water from a paper manufacturing process sufficient to produce flock formation and precipitation, and recovering the resulting precipitate from said water.

4. The process of claim 3 wherein the aluminum sulfite added is of the order of 0.02 per cent by weight.

5. In the process of clarifying the white water from a paper mill, the step which comprises adding aluminum sulfite to the paper stock in amount at least sufficient to produce flock formation and precipitation of the suspended matter in the white water obtained in the paper making process.

6. In the process of clarifying the white water from a paper mill, the step which comprises adding aluminum sulfite to the beater in the manufacture of paper in amount more than sufficient to produce precipitation of any size present and sufficient to produce flock formation and precipitation in the white water obtained in the paper making process.

7. In the clarification and decolorization of raw waters, the process which comprises adding to such a water aluminum sulfite in amount approximately equal to one-half the quantity of aluminum sulfate required to clarify said water, then separating the resulting precipitate from the water.

KURT SCHWABE.
KARL BÜCHE.